Dec. 13, 1966
R. E. RASCHE
3,291,973
BINARY SERIAL ADDERS UTILIZING NOR GATES
Filed Sept. 22, 1964
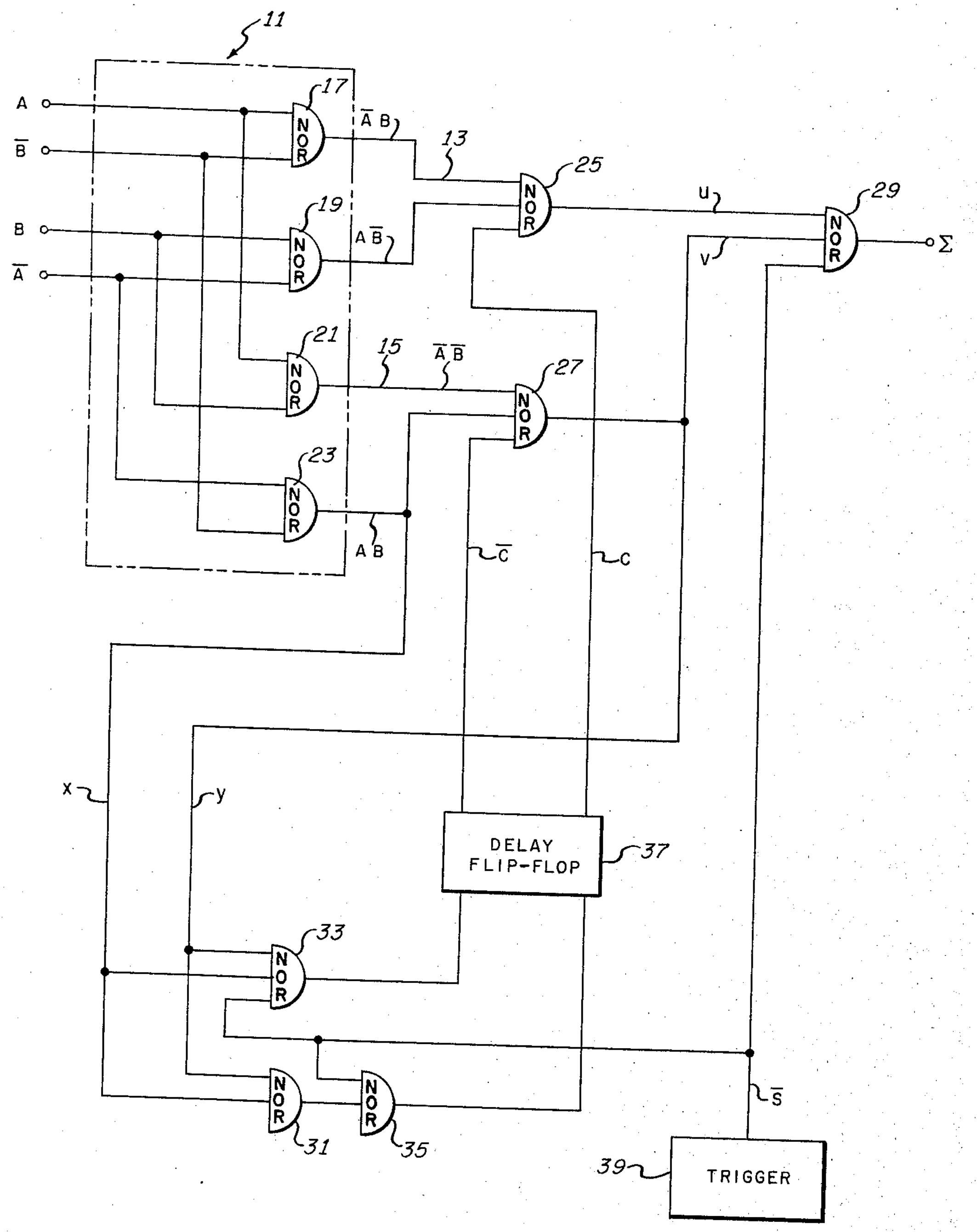
INVENTOR.
ROBERT E. RASCHE
BY S. C. Yeaton
ATTORNEY United States Patent Office 3,291,973

Patented Dec. 13, 1966

3,291,973

BINARY SERIAL ADDERS UTILIZING NOR GATES

Robert E. Rasche, Plainview, N.Y., assignor to Sperry Rand Corporation, Great Neck, N.Y., a corporation of Delaware Filed Sept. 22, 1964, Ser. No. 398,375
10 Claims. (Cl. 235—176)

This invention relates to adding circuits for use in binary digital computers and more specifically to binary serial full adders.

In performing an addition of two binary coded variables with a full adder, the variables are added digit by digit beginning with the least significant digit in each of the variables. A separate digital operation is performed on each pair of corresponding digits. Whenever a carry term is developed as a result of a given digital addition, this term must be included in the following digital addition operation in order to obtain the correct result.

Conventional serial full adders are constructed in accordance with a Boolean equation that inherently requires five stages of delay before a sum is available.

Furthermore, conventional serial full adders require relatively large numbers of components which add to the cost and complexity of the device.

It is an object of the present invention to provide a binary serial full adder that is capable of high speed operation.

It is another object of the present invention to provide a binary serial full adder that requires fewer components than the prior art devices.

The principles and operation of the invention may be understood by referring to the following description taken together with the accompanying drawing in which the single figure represents the presently preferred circuit of a full adder employing the principles of the invention.

Referring now to the drawing, a circuit for adding two variables includes a pair of terminals for receiving signals indicated by A and B, and representing corresponding digits in the two variables. A second pair of terminals for receiving the corresponding digital complements, designated as $\overline{A}$ and $\overline{B}$, are also available. Signals from these input terminals are applied to a sorting means 11 in which each pair of input signals is steered to a particular channel determined by the binary value of the constituent signals in the pair. Thus, for example, when $A=0$ and $B=1$, an output signal will be obtained in channel 13, whereas an input signal in which $A=0$ and $B=0$ will produce an output signal in channel 15.

The sorting means 11 employs four NOR gates 17, 19, 21 and 23. The construction of typical NOR gates and their use in sorting circuits is described by S. A. Chao in an article entitled "A Generalized Resistor-Transistor Logic Circuit and Some Applications" appearing on pages 8–12 of the IRE Transactions on Electronic Computers, volume EC–8, No. 1, for March 1959. Briefly, NOR gates operate to produce an output signal only during the absence of all input signals. Any input signal closes the gate and reduces its output voltage to zero.

The unlike combinations of signals, $\overline{A}B$ and $A\overline{B}$, from the sorting means 11 are applied to an unlike NOR gate 25 whereas the like combinations of signals, AB and $\overline{AB}$, from the sorting means 11 are applied to the like NOR gate 27.

The output of the gate 25 constitutes a first intermediate signal, designated as "$u$" in the drawing. This signal is applied to an output NOR gate 29.

The output of the gate 27 constitutes a second intermediate signal, designated as "$v$" in the drawing. This signal is also applied to the gate 29.

An output signal from the NOR gate 29 constitutes a binary ONE sum signal.

An AB signal from the sorting means 11 is also applied to the input terminals of a forward carry NOR gate 31 and an inverse carry NOR gate 33. Any output signal from the gate 27 is also applied to these carry gates. These signals are designated as "$x$" and "$y$" in the accompanying drawing. The output of the gate 31 is further applied to an inverting NOR gate 35. The outputs of the gates 33 and 35 are applied to a delay flip-flop 37.

Delay flip-flops are well-known in the art. They combine a conventional flip-flop circuit and a delay means. An input signal switches the flip-flop to the appropriate bistable state only after the lapse of a predetermined time. Conventionally, such delay flip-flops may contain a monostable multivibrator in each input channel. An input signal triggers the appropriate multivibrator into its quasi-stable state. When the monostable returns to its stable state, it triggers the flip-flop to its appropriate stable state. The delay flip-flop produces a carry signal or an inverse carry signal, designated as C or $\overline{C}$, respectively, in the drawing.

The output signals from the flip-flop are applied to the gates 25 and 27. These signals have sufficient amplitude and the proper polarity to cut off the associated NOR gates.

An output signal from the inverse carry gate 33 triggers the flip-flop into the state in which it produces an inverse carry output signal. An output signal from the gate 35 triggers the flip-flop so that it produces a forward carry output signal.

The delay in the flip-flop is made long enough so that a switching signal derived from one of the gates 33 and 35 as the result of a digital addition cannot switch the flip-flop until after that addition is completed. The delay is short enough however to insure that the flip-flop will be switched before the following digital addition is to be performed.

A digital addition is completed when a sampling pulse $\overline{S}$ is produced by a trigger 39. The normal output of the trigger consists of a steady voltage sufficient to maintain the gates 29, 33 and 35 in a condition such that they produce no output voltage. Sampling pulses are produced by momentarily reducing this voltage to substantially zero level.

It will be remembered that $x$ and $y$ signals are applied to both of the carry gates 31 and 33. If neither $x$ nor $y$ is being applied when a sampling pulse occurs, a switching signal will pass to the flip-flop 37 through the gate 33. There will also be an output from the gate 31 under these conditions. This output, however, is applied to the inverting gate 35 so that no output will be available from the gate 35 even during the sampling pulses. Under these conditions, the flip-flop will eventually be switched to the inverse carry state by the pulse from the gate 33.

On the other hand, if either $x$ or $y$ is present, the sampling pulse cannot cause an output to appear at the gate 33. The presence of either $x$ or $y$, furthermore, will also keep the gate 31 cut off. The sampling pulse will cause an output to appear at the inverting gate 35 and thus eventually switch the flip-flop to the carry state.

Several generalizations can be made by referring to the drawing:

A first intermediate or $u$ signal will be obtained unless an unlike combination or a carry signal is applied to the unlike NOR gate 25.

$v$ and $y$ signals will be obtained unless a like combination or an inverse carry signal is applied to the like NOR gate 27.

A binary ONE sum signal will be obtained in response to a sampling pulse if both $u$ and $v$ are zero.

A carry signal will be available for a future digital addition whenever an $x$ or $y$ is produced.

An inverse carry signal will be available for a future digital addition when neither $x$ nor $y$ is produced.

The operation of the circuit in response to all of the possible combinations of input signals and existing carry signals can be summarized as follows:

| | u | v | x | y | Σ | C+1 |
|---|---|---|---|---|---|---|
| $\bar{A}\,\bar{B}\,\bar{C}$ | 1 | 0 | 0 | 0 | 0 | 0 |
| $A\,\bar{B}\,\bar{C}$ | 0 | 0 | 0 | 0 | 1 | 0 |
| $\bar{A}\,B\,\bar{C}$ | 0 | 0 | 0 | 0 | 1 | 0 |
| $A\,B\,\bar{C}$ | 1 | 0 | 1 | 0 | 0 | 1 |
| $\bar{A}\,\bar{B}\,C$ | 0 | 0 | 0 | 0 | 1 | 0 |
| $A\,\bar{B}\,C$ | 0 | 1 | 0 | 1 | 0 | 1 |
| $\bar{A}\,B\,C$ | 0 | 1 | 0 | 1 | 0 | 1 |
| $A\,B\,C$ | 0 | 0 | 1 | 0 | 1 | 1 |

In this table, $C+1$ indicates the carry pulses that are made available for the following digital addition.

The operation may be understood by considering a typical addition. Assume that both A and B digits are equal to binary ONE and that no carry was produced by the previous digital addition. This condition is represented by the $AB\bar{C}$ line in the table. The received signal, AB, will appear at the output of the gate 23 in the sorting means. Since no input signal is applied to the unlike NOR gate 25 there will be a $u$ signal. Either the A, B or the $\bar{C}$ signal is sufficient to negate the output of the gate 27, however, so that no $v$ signal will be applied to the output NOR gate 29 and no $y$ signal will be applied to the carry gates 31 and 33. However, an $x$ signal is applied to both of these carry gates.

After sufficient time has elapsed to permit the circuit to settle, a sampling pulse is applied. Since a $u$ pulse is being applied to the gate 29, there can be no output from this gate and a zero output will be indicated.

Since an input signal is being applied to the inverse carry gate 33, the sampling pulse applied to this gate is ineffective. No output will appear. The forward carry gate 31 is also cut off by the $x$ signal so that it produces no signal at the input of the inverting gate 35. The sampling pulse, therefore, can open this gate and permit a switching pulse to switch the flip-flop 37. The flip-flop will switch to the carry state in time for the following digital addition.

By referring to the drawing, the Boolean equations describing the operation of the adder may be formulated as follows:

$$SUM=(\bar{A}B+\bar{B}A+C)\ (\bar{A}\bar{B}+AB+\bar{C})$$

$$CARRY=\overline{(\bar{A}\bar{B}+AB+\bar{C})}+AB$$

In arriving at a sum, a stage of delay is required to "AND" the various individual terms in the sum equation. A second stage of delay is required to "OR" the resultant terms, and finally a third stage of delay is required to "AND" the two terms enclosed in parentheses. Since the carry terms are generated along with the sum terms, no additional stages of delay are necessary for carry signal generation.

In some situations, it may not be desired to provide binary ONE output signals in the form of a pulse. In such situations, the connection between the trigger 39 and the output NOR gate may be eliminated. Under these circumstances, a binary ONE sum signal will be provided whenever there is no output from the gates 25 and 27.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A serial full adder for adding a first variable composed of A and $\bar{A}$ digits to a second variable composed of B and $\bar{B}$ digits comprising means to sort each pair of incoming digits according to the binary value of the constituent digits in the pair; means to store carry and inverse carry signals for use in a succeeding digital addition; means to produce a first intermediate signal when a like combination signal is produced by the sorting means and an inverse carry signal is being stored in said storage means; means to produce a second intermediate signal when an unlike combination signal is produced by the sorting means and a carry signal is being stored in said storage means; an output NOR gate connected to receive said first and second intermediate signals; means to initiate storage of a carry signal in response to an AB signal from said sorting means; means to initiate storage of a carry signal in response to a second intermediate signal; an inverse carry NOR gate connected to receive AB signals from said sorting means and second intermediate signals; means to initiate storage of an inverse carry signal in response to an output from said inverse carry NOR gate; and an output terminal on said output NOR gate for connecting the adder to an external load.

2. A binary serial full adder comprising individual input means to receive the direct digits in the variables to be added; individual input means to receive the NOT digits in the variables to be added; means to sort pairs of received digits into combinations representing the binary values of the constituent digits in the pair; means to store carry and inverse carry signals until a subsequent digital addition is to be made; a like NOR gate connected to receive combinations of like signals from said sorting means and carry signals from said storage means; an unlike NOR gate connected to receive combinations of unlike signals from said sorting means and inverse carry signals from said storage means; an output NOR gate connected to receive signals from said like NOR gate and said unlike NOR gate; a carry and an inverse carry NOR gate each connected to receive the output of said like NOR gate and combinations of like direct digits from said sorting means; an inverting NOR gate connected to receive signals from said carry NOR gate; means responsive to an output signal from said forward carry NOR gate to initiate the storage of a carry signal; means responsive to the output of said inverting NOR gate to initiate the storage of an inverse carry signal, and an output terminal on said output NOR gate for connecting the adder to an external load.

3. A serial full adder for adding a first variable composed of A and $\bar{A}$ digits to a second variable composed of B and $\bar{B}$ digits comprising means to sort each pair of incoming digits according to the binary values of the constituent digits in the pair; means to store carry and inverse carry signals for use in a succeeding digital addition; means to produce a sampling pulse; means connected to the output of said sorting means for producing a first intermediate signal upon the reception of a pair like digits in the presence of an inverse carry signal; means connected to the output of said sorting means for producing a second intermediate signal upon the receipt of unlike digits in the presence of a carry signal; an output NOR gate connected to receive said first and second intermediate signals; a forward carry NOR gate; an inverse carry NOR gate; means to initiate storage of a carry signal in response to a sampling pulse and an AB signal from said sorting means; means to initiate storage of a carry signal in response to a sampling pulse and a second intermediate signal; and means to initiate storage of an inverse carry signal whenever a sampling pulse is produced in the absence of an AB signal from said sorting means and in the absence of a second intermediate signal.

4. A serial full adder for adding a first variable composed of A and $\bar{A}$ digits to a second variable composed of B and $\bar{B}$ digits comprising a sorting means; a plurality of four NOR gates in said sorting means, each NOR gate being connected to receive a different one of the possible combinations of input signals; means to store carry and inverse carry signals for use in a succeeding digital addition; trigger means to produce a sampling pulse; means to produce a sum output signal in response to an unlike combination signal from said sorting means, an inverse carry signal from said storage means, and a sampling pulse from said trigger means; means to produce a sum output signal in response to a like combination signal from said sorting means, a carry signal from said storage means, and a sampling pulse from said trigger means; means to initiate storage of a carry signal in response to a sampling pulse whenever an unlike signal is being supplied by the sorting means and a previous carry signal is being supplied by the storage means; means to initiate storage of a carry signal in response to a sampling pulse whenever an AB signal is being supplied by the sorting means; means to initiate storage of an inverse carry signal in response to a sampling pulse whenever an $\overline{AB}$ signal is being supplied by the sorting means; and means to retain storage of an inverse carry signal in response to a sampling pulse whenever an unlike combination signal is being supplied by the sorting means and an inverse carry signal is being supplied by the storage means.

5. A serial full adder for adding a first variable composed of A and $\bar{A}$ digits to a second variable composed of B and $\bar{B}$ digits comprising means to sort pairs of incoming signals according to the binary values of the constituent digits; means to store carry and inverse carry signals; a first NOR gate coupled to receive like signals from said sorting means and stored carry signals from said storage means whereby an output from said NOR gate will be available until a signal is received by said gate; a second NOR gate connected to receive unlike signals from said sorting means and stored inverse carry signals from said storage means whereby an output signal from said NOR gate will be available until a signal is received by said gate; trigger means to supply sampling pulses capable of opening a NOR gate; an output NOR gate connected to receive sampling pulses and signals from said first and second NOR gates; forward and inverse carry gates connected to receive AB signals from said sorting means and output signals from said second NOR gate, said inverse carry gate being further connected to receive sampling pulses from said trigger; means to initiate storage of a carry signal in said storage means in response to a signal from said forward carry gate and a sampling pulse; and means to initiate storage of an inverse carry signal in response to a signal from said inverse carry gate.

6. A serial full adder for adding a first variable composed of A and $\bar{A}$ digits to a second variable composed of B and $\bar{B}$ digits comprising means to sort corresponding digits in the two variables according to the binary values of the constituent digits; flip-flop means to store carry and inverse carry signals; a first NOR gate connected to receive $\bar{A}B$ and $A\bar{B}$ signals from said sorting means and stored carry signals from said flip-flop; a second NOR gate connected to receive AB and $\overline{AB}$ signals from said sorting means and inverse carry signals from said flip-flop; an output NOR gate; trigger means to provide sampling pulses suitable for opening the NOR gates; said output NOR gate being connected to receive the output of said first and second NOR gates and said trigger; a terminal on said output NOR gate to provide sum signals; forward and inverse carry NOR gates connected to receive AB signals from said sorting means and output signals from said second NOR gate; said inverse carry NOR gate further being connected to receive sampling pulses from said trigger; means to switch said flip-flop to the carry state in response to an output signal from said forward carry NOR gate; and means to switch said flip-flop to the inverse carry state in response to a signal from said inverse carry NOR gate.

7. A serial full adder for adding a first variable composed of A and $\bar{A}$ digits to a second variable composed of B and $\bar{B}$ digits comprising means to sort each pair of incoming digits according to the binary value of the constituent digits in each pair; means to store carry and inverse carry signals for use in a succeeding digital addition; means to produce a first intermediate signal when a like combination is produced by the sorting means and an inverse carry signal is being stored in said storage means; means to produce a second intermediate signal when an unlike combination is produced by the sorting means and a carry signal is being stored in said storage means; an output NOR gate connected to receive said first and second intermediate signals; an output terminal on said output NOR gate for providing sum signals to an external load; a forward carry NOR gate connected to receive said second intermediate signals and AB signals from said sorting means; an inverting NOR gate connected to receive signals from said forward carry NOR gate; means to initiate storage of a carry signal in response to an output signal from said inverting NOR gate; an inverse carry NOR gate connected to receive said second intermediate signals and AB signals from said sorting means; and means to initiate storage of an inverse carry signal in response to an output signal from said inverse carry NOR gate.

8. A serial full adder for adding a first variable composed of digits having binary values of A and $\bar{A}$ to a second variable composed of digits having binary values of B and $\bar{B}$ comprising input means to receive pairs of signals representing corresponding binary digits in the variables to be added; means to sort the received pairs of signals according to the binary values of the constituent signals; trigger means to produce a sampling pulse whenever a digital addition is to be performed; a delay flip-flop to produce carry signals in one stable state and inverse carry signals in the other stable state; a first NOR gate connected to receive $\bar{A}B$ and $A\bar{B}$ signals from said sorting means and a carry signal from said flip-flop, said first NOR gate serving to produce a resultant signal only when the gate receives no input signal; a second NOR gate connected to receive $\overline{AB}$ and AB signals from said sorting means and inverse carry signals from said flip-flop, said second NOR gate serving to produce a resultant signal only when the gate receives no input signal; an output NOR gate connected to receive resultant signals from said first and second NOR gates and sampling pulses from said trigger means; means responsive to an AB signal from said sorting means and a sampling pulse to switch said delay flip-flop to the state in which it produces a carry signal; means responsive to a resultant signal from said second NOR gate and a sampling pulse to switch said delay flip-flop to the stable state in which it produces a carry signal; and means responsive to a sampling pulse in the absence of both an AB signal and a resultant signal from said second NOR gate to switch said delay flip-flop to the state in which it produces an inverse carry signal.

9. A serial full adder for adding A and B variables comprising:

(a) a sorting means,
(b) a flip-flop to store a carry signal from a previous addition,
(c) a first NOR gate connected to receive a carry signal from said flip-flop, an $A\bar{B}$ signal and a $\bar{A}B$ signal from said sorting means,
(d) a second NOR gate connected to receive an inverse carry signal from said flip-flop, an AB signal and an $\overline{AB}$ signal from said sorting means, (e) a trigger to provide $\overline{S}$ pulses when a sum is to be indicated,
(f) an output NOR gate connected to receive signals from said first and second NOR gates and from said sampling pulse source,
(g) an inverse carry NOR gate connected to receive AB signals from said sorting means, signals from said second NOR gate, and pulses from said trigger,
(h) a forward carry NOR gate connected to receive AB signals from said sorting means and signals from said second NOR gate, and
(i) an inverting NOR gate connected to receive sampling pulses and the output of said forward NOR gate,
(j) said inverse carry NOR gate being connected to switch the flip-flop to the state in which it produces an inverse carry signal,
(k) said inverting NOR gate being connected to switch the flip-flop to the state in which it produces a carry signal.

10. A serial full adder comprising:
(a) means to receive direct and complementary input signals corresponding to the digits in the variables to be added,
(b) a sorting means to provide individual signals corresponding to the four possible combinations of input signals,
(c) a flip-flop to provide carry and inverse carry signals,
(d) a trigger to provide sampling pulses,
(e) a first NOR gate connected to receive output signals from said sorting means representative of either unlike combination of input signals, said first NOR gate being further connected to receive carry signals from said flip-flop,
(f) a second NOR gate connected to receive output signals from said sorting means representative of either like combination of input signals, said second NOR gate being further connected to receive inverse carry signals from said flip-flop, (g) an output NOR gate connected to receive signals from said first and second NOR gates and said trigger whereby a sum output signal is produced in response to a sample pulse if neither of the first and second NOR gates is providing an output signal,
(h) a forward carry NOR gate and an inverse carry NOR gate, each connected to receive an output signal from said second NOR gate and any signal from said sorting means resulting from the reception of a pair of direct input signals, said inverse carry NOR gate being further connected to receive sampling pulses from said trigger,
(i) an inverting NOR gate connected to receive a signal from said forward carry NOR gate and sampling pulses from said trigger, and
(j) first and second monostable multivibrators connected to receive signals from said inverse carry NOR gate and from said inverting NOR gate respectively,
(k) said first and second monostable multivibrators being coupled to switch the flip-flop to the inverse carry and the carry states respectively.

References Cited by the Examiner

UNITED STATES PATENTS

| | | | |
|---|---|---|---|
| 3,094,614 | 6/1963 | Boyle | 235—176 |
| 3,100,837 | 8/1963 | Gesek | 235—176 X |
| 3,125,676 | 3/1964 | Jeeves | 235—176 |

OTHER REFERENCES

Boyle: NOR Block Full Adder, IBM Technical Disclosure Bulletin, volume 3, No. 4 (page 48), September 1960.

Earle et al.: Carry Look-Ahead Adder, IBM Technical Disclosure Bulletin, volume 3, No. 9 (pages 17 and 18), February 1961.

MALCOLM A. MORRISON, *Primary Examiner.*

M. P. HARTMAN, *Assistant Examiner.*